United States Patent Office 3,317,638
Patented May 2, 1967

3,317,638
PREPARATION OF LONG OXYALKYLENE CHAIN PHOSPHATE POLYOLS
Robert J. Hartman, Wyandotte, and Louis C. Pizzini, Trenton, Mich., assignors to Wyandotte Chemicals Corporation, Wyandotte, Mich., a corporation of Michigan
No Drawing. Filed July 25, 1963, Ser. No. 297,655
13 Claims. (Cl. 260—978)

This invention relates to the production of phosphorus-containing compounds characterized by the presence of long oxyalkylene chains.

In the production of polyurethane products and particularly polyurethane foams, it has long been desired to produce such a product which possesses improved resistance to burning and flame propagation and to non-inflammability and the capacity to self-extinguish fires. In the prior art, it has been the practice to produce flameproof products of various types by incorporation of phosphorous into the molecule. The production of polyurethane is generally accomplished by reacting a compound possessing active hydrogen groups with a polyisocyanate and, accordingly, it would appear that resistance to burning and flame propagation could be improved by incorporating phosphorus into one of these major components.

A method for producing an active hydrogen-containing compound containing phosphorus and the resulting compounds is disclosed in Adams and Shoemaker, U.S. Pat. No. 2,372,244. It is known, as taught for example in Pat. No. 2,372,244, to react phosphoric acid or phosphorus acid with an olefin oxide or alkylene oxide to produce reaction products possessing hydroxyl groups as indicated by the reaction equations set forth in the patent. However, when employing the reactions of this patent, the product obtained contains no more than an average of two oxyalkylene groups or reacted epoxy groups per OH group of the phosphoric acid. Upon investigation, it has been found that in the reaction of orthophosphoric acid with an alkylene oxide the reaction terminates after 6 mols of the alkylene oxide has reacted per mol of orthophosphoric acid and, thus, the maximum obtained is an average of two oxyalkylene units or reacted epoxy groups per OH group of the phosphoric acid. Even when adding large excesses of alkylene oxide and employing high temperatures and high pressures further oxyalkylation does not take place and a reaction product of more than 6 mols of alkylene oxide per mol of orthophosphoric acid cannot be obtained by the method disclosed in the patent.

A product which contains no more than an average of 2 oxyalkylene groups per OH group of the phosphoric acid is not suitable for the production of flexible foams since flexible foams require longer oxyalkylene chains. Further, for many applications it is desired to merely increase fire resistance and non-inflammability or self-extinguishing properties are not required. Accordingly, for such applications an active hydrogen-containing compound containing phosphorus is often mixed with a similar active hydrogen-containing compound that does not contain phosphorus to produce a product which while it is not non-inflammable or self-extinguishing possesses the desired properties and is sufficiently fire resistant for the desired application. The prior art products wherein no more than 6 mols of alkylene oxide are reacted per mol of orthophosphoric acid cannot be mixed with the similar active hydrogen-containing compounds which do not contain phosphorus due to incompatibility and therefore cannot be employed for such applications. An example of such an application is in the flame laminating of a polyurethane foam to a fabric. In this process, the foam is heated to the softening point wherein the material is tacky and may then be bonded to the fabric. While polyurethane foams obtained from polyesters may be so heated without burning, a polyurethane foam obtained from polyethers will generally burn before the desired softening point is reached. By mixing a phosphorus-containing polyether with a conventional polyether, the flame resistance is increased to the point wherein the foam can be heated to the softening point without burning and bonded to the fabric.

Accordingly, it is a purpose of this invention to provide a method of producing phosphorus-containing compounds characterized by the presence of long oxyalkylene chains, i.e. phosphorus-containing compounds wherein the phosphorous is initially obtained from an acid of phosphorus, which compounds contain an average of more than 2 and particularly an average of more than 3 oxyalkylene or reacted epoxy groups per OH group of the acid.

The expression "alkylene oxide" as employed herein includes halogenated or halogen-substituted alkylene oxides. The halogen-substituted alkylene oxides which are preferred when halogen-substituted alkylene oxides are employed have the formula indicated below:

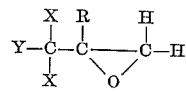

in which X is selected from the group consisting of hydrogen, halogen and organic radicals free from functional groups reactive with the oxirane group of the epoxide, Y is a halogen and R is selected from the group consisting of hydrogen and organic radicals free from functional groups reactive with the oxirane group of the epoxide.

The long oxyalkylene chain phosphorous-containing compounds of this invention are useful not only in the production of flame resistant polyurethanes, particularly urethane foams, but also for other purposes such as additives in lubricating oils and for surface active and detergent compositions. Further, these products may also be used as a source of organic polyhydroxy compounds for reaction with polycarboxylic acids such as maleic or fumaric acid or anhydrides to provide polyesters, and polyepoxides to make epoxide resins.

This invention comprises reacting, in the presence of a catalyst selected from the group consisting of boron trifluoride and stannic chloride an alkylene oxide with a compound selected from the group consisting of an acid of phosphorous and the reaction product of an acid of phosphorous and an alkylene oxide. In view of their ready availability and low cost, the chlorinated alkylene oxides are preferred where halogenated alkylene oxides are to be employed.

This invention is based on the discovery that by the use of a catalyst selected from the group consisting of boron trifluoride and stannic chloride, the long oxyalkylene chain phosphorous-containing compounds produced by the reaction of an acid of phosphorous with an alkylene oxide can be obtained which contain an average of more than two oxyalkylene groups and particularly an average of more than three oxyalkylene groups per OH unit of the acid of phosphorous whereas by the use of conventional prior art techniques such long oxyalkylene chain phosphorous compounds cannot be produced. Since boron trifluoride is a gas at the normal reaction temperature employed, it is desirable to add the boron trifluoride in the form of a compound or complex of boron trifluoride which is liquid at the reaction temperature. Accordingly, the term "boron trifluoride" as used herein includes boron trifluoride and compounds and complexes of boron trifluoride which facilitate the use of boron trifluoride in the reaction. Ether compounds and complexes of boron trifluoride are preferred. These materials are disclosed and discussed in Boron Trifluoride and Its Derivatives, by Harold Simmons Booth and Donald Ray Martin, pages 68–71, John Wiley and Sons, Inc., New York, 1949. In general, compounds and complexes of the lower ethers are preferred since these provide higher percentages of $BF_3$ in the compound or complex. Particularly preferred are the boron trifluoride compounds or complexes of dimethylether, diethyl ether, methyl ethyl ether and tetrahydrofuran. A suitable product which is readily available is the well known commercial product known as boron trifluoride etherate which is primarily the boron trifluoride complex of diethyl ether.

The alkylene oxides useful in this invention contain the oxirane ring. Suitable alkylene oxides include propylene oxide, the isomeric butylene oxides, hexylene oxide, octylene oxide, dodecene oxide, methoxy and other alkoxy propylene oxides; styrene oxide and cyclohexene oxide can also be used as well as dioxides or diepoxides illustrated by the diglycidyl ether monomer of Bisphenol A. Halogenated alkylene oxides may also be used such as epichlorohydrin, epiiodohydrin, epibromohydrin, 3,3-dichloropropylene oxide, 3-chloro-1,2-epoxypropane, 3-chloro-1,2-epoxybutane, 1-chloro-2,3-epoxybutane, 3,4-dichloro-1,2-epoxybutane, 1,4-dichloro-2,3-epoxybutane, 1-chloro-2,3-epoxypentane and 3,3,3-trichloropropylene oxide. Mixtures of any of the above alkylene oxides may be employed as well as any single alkylene oxide.

Various acids of phosphorous may be used including 100% phosphoric acid or orthophosphoric acid and phosphorous-containing acids, such as pyrophosphoric acid, polyphosphoric acid and meta phosphoric acid, which correspond to a mixture of phosphorous pentoxide and water containing from 72.4 to 90 percent by weight of phosphorous pentoxide with from 10 to 27.6 percent by weight of water. In these mixtures, the phosphorous-containing acids which may be formed by reaction of the phosphorous pentoxide with water may exist in polymeric form. Phosphorous acid and partial esters of phosphorous acids such as the mono- and diesters of ortho- phosphoric acid, the monoesters of phosphorous acid and the mono-, di- and triesters of pyrophosphoric acids such as the symmetrical and unsymmetrical dimethyl acid pyrophosphate and ethyl acid phosphate are also usable in the invention. In addition, phosphonic acids such as chloromethyl phosphonic acid, phenyl phosphonic acid, trichloromethane phosphonic acid, hydroxymethyl phosphonic acid and allyl phosphonic acid and phosphinic acids such as diphenyl phosphinic acid, phenyl phosphinic acid, bis-hydroxymethyl phosphinic acid and methyl phosphinic acid may also be employed.

This invention may be carried out by either reacting an alkylene oxide with an acid of phosphorous in an amount to provide an average of more than two oxyalkylene groups or reacted epoxy groups for each OH group of the phosphorous-containing acid in the presence of a catalyst selected from the group consisting of boron trifluoride and stannic chloride or a reaction product of an acid of phosphorus and an alkylene oxide prepared by conventional methods such as the methods of Patent Nos. 2,372,244 and 3,094,549 may be reacted with an alkylene oxide in the presence of such catalyst in order to increase the average number of alkylene oxide units per OH group of the acid to a number greater than 2. The latter method is preferred and more specifically involves reacting any amount of alkylene oxide, depending upon the length of alkylene oxide chains desired in the final product with the reaction product of an acid of phosphorus and an alkylene oxide such as disclosed in U.S. Patents Nos. 2,732,244 and 3,094,549. A high molecular weight product may be produced by alternate additions of catalyst and alkylene oxide to the reactants as disclosed in Examples III and VI below.

It is preferred to react from about 6 to 150 mols of an alkylene oxide per mol of an acid of phosphorus or from about 1 to 150 mols of an alkylene oxide per mol of a reaction product of an acid of phosphorus and an alkylene oxide containing from about 1 to 3 reacted epoxy groups per OH group of the acid in the presence of the above-described catalyst.

Concentration of the catalyst employed for the reaction of the alkylene oxide with the phosphorus-containing compound can vary, depending upon the individual catalyst. In general, the catalyst for the reaction is used in small concentrations up to about 5 weight percent and generally less than 1 weight percent of the weight of the total reactants. The minimum effective amount is about 0.05% by weight of total reactants.

The method of this invention can be performed at various pressures, atmospheric and superatmospheric, but atmospheric pressure is preferred for convenience. The temperature of the reaction can vary from 0° to 150° C. and the preferred range is from 30° to 80° C. The reaction is preferably effected by incremental addition of the alkylene oxide to the phosphorus-containing acid or the reaction product of an acid of phosphorus and an alkylene oxide such as those disclosed in U.S. Patents Nos. 2,372,244 and 3,094,549 as well as acidic intermediates derived by incomplete oxyalkylation reactions in the processes of these patents. Since the reaction is exothermic, the temperature is primarily controlled by cooling such as in a water bath or a water jacketed container. After the alkylene oxide addition is completed and the reactants intimately mixed together by stirring, the temperature is desirably raised slowly to the preferred reaction temperature and held at this temperature until the reaction has been completed. Any excess of alkylene oxide and/or volatile by-products which may be present at the completion of the reaction can be removed by stripping at reduced pressure. While addition of alkylene oxide to the acid of phosphorus or reaction product of an acid of phosphorus and an alkylene oxide is preferred, the reverse procedure, i.e. addition of the acid of phosphorus or above-described reaction product to the alkylene oxide, may be employed as shown in Example IX below.

Specific examples illustrating the practice of this invention are set forth below.

*Example 1*

447 grams (1.05 mol) of an essentially neutral (acid number 0.3) propylene oxide-100% phosphoric acid reaction product prepared by a method similar to that described in Example I of U.S. Patent No. 2,372,244 containing 5.6 oxypropylene groups per phosphoric acid unit was added to a 1-liter, 3-necked, round-bottom flask equipped with a stirrer, condenser, thermometer and dropping funnel. 2.6 grams (18 millimols) of commercial boron trifluoride etherate were added to the polymer with stirring. The reaction mixture was then heated to 60° C. and 523 grams (9.00 mols) propylene oxide were added dropwise with stirring over a 5.3-hour period. The reaction is exothermic and the reaction mixture was maintained at between 65 and 70° C. by external cooling during the propylene oxide addition. After all of the propylene oxide was added (the exotherm decreased toward the end of the propylene oxide addition) the reaction mixture was heated to 70° C. and held at that temperature for two hours.

39 grams of magnesium silicate were added to the resulting product to remove the boron trifluoride etherate catalyst. This mixture was heated with stirring at 70° C. for one hour. The mixture was then filtered and the filtrate stripped of volatiles by heating at 80° C. and 1 mm. mercury pressure for two hours under a nitrogen atmosphere. The final yield was 87.2% of polyoxypropylene phosphate ester containing 12.2 oxypropylene groups per phosphoric acid unit. The product had a hydroxyl number of 204 and an acid number of 0.38.

Example II 49 grams (0.500 mol) of 100% phosphoric acid containing 1.30 grams (9.00 millimols) of commercial boron trifluoride etherate were added to a 0.5 liter, 3-necked, round-bottom flask equipped with a stirrer, condenser, thermometer and dropping funnel. The reaction mixture was then heated to 60° C. and 436 grams (7.50 mols) of propylene oxide were added dropwise with stirring over a 6.1-hour period while the reaction mixture was maintained at between 60 and 65° C. by external cooling. After all the propylene oxide was added (the exotherm decreased toward the end of the propylene oxide addition) the reaction mixture was heated to 70° C. and held at that temperature for two hours. The catalyst was removed and the product stripped in the same fashion as described in Example I. The final yield was 85.5% of phosphate ester containing 12.6 oxypropylene groups per phosphoric acid unit. The hydroxyl number was 209 and the acid number was 0.34.

Example III 98 grams (1.00 mol) of 100% phosphoric acid were added to a 0.5-liter, 3-necked, round-bottom flask equipped with a stirrer, condenser, thermometer and dropping funnel. The acid was then heated to 65° C. and 348 grams of propylene oxide (6 mols) were added dropwise with stirring without the presence of any external catalyst while the reaction mixture was maintained at between 65 and 70° C. by external cooling. 5.1 grams of boron trifluoride etherate were then added to the reaction mixture, followed by the dropwise addition of 696 grams (12 mols) of propylene oxide. 5.1 more grams of boron trifluoride etherate were then added to the reaction mixture followed by the addition of 348 grams (6 mols) propylene oxide dropwise to the reaction mixture. An additional 5.1 grams of boron trifluoride etherate were then added to the reaction mixture, making a total of 108 millimols of boron trifluoride etherate. A final 348 grams (6 mols) of propylene oxide were then added dropwise. The propylene oxide additions were at a rate of 75 grams per hour. After all the propylene oxide was added, the reaction mixture was heated to 70° C. and held at this temperature for 2 hours. The catalyst was then removed and volatiles stripped in the same manner as described in Example I. The final yield was 86.0% of phosphate ester containing 25.6 oxypropylene groups per phosphoric acid unit. The product had a hydroxyl number of 127 and an acid number of 1.4.

Example IV 212 grams (0.508 mol) of an essentially neutral (acid number 0.5) propylene oxide-100% phosphoric acid reaction product prepared by a method similar to that described in Example I of U.S. Patent No. 2,372,244 containing 5.5 oxypropylene groups per phosphoric acid unit were added to a 0.5-liter, 3-necked, round-bottom flask equipped with a stirrer, condenser, thermometer and dropping funnel. 58.1 grams (1.0 mol) of propylene oxide were added and the temperature of the reaction mixture was raised to reflux; the temperature of the reaction mixture after reflux was 49° C. The reaction mixture was then cooled to 20° C., 3 grams (11.0 millimols) of stannic chloride were added and the temperature of the mixture rose to 38° C. The reaction mixture was refluxed with stirring and the temperature of the reflux rose from 54° C. to 70° C., indicating an uptake of propylene oxide. The reaction mixture was then heated at 70° C. for 2 hours. The reaction mixture was stripped of volatiles by heating at 80° C. and 1 mm. pressure for 2 hours under a nitrogen atmosphere. The final yield of product was 261 grams, corresponding to a 95.5% yield. The resulting phosphate ester contained 7.07 oxypropylene groups per phosphoric acid unit.

Example V 100 grams (0.100 mol) of an essentially neutral propylene oxide-polyphosphoric acid reaction product, prepared by the reaction of propylene oxide with a polyphosphoric acid equivalent to a mixture of 82% phosphorus pentoxide and 18% water, containing 13 oxypropylene groups per unit of the polyphosphoric acid were added to a 0.5 liter, 3-necked, round-bottom flask equipped with a stirrer, condenser, thermometer and dropping funnel. 0.5 gram (3.5 millimols) of boron trifluoride etherate was added to the polymer with stirring. The reaction mixture was then heated to 60° C. and 184 grams of dodecene oxide (1.00 mol) were added dropwise with stirring over a 1.5-hour period while the reaction mixture was maintained at between 65 and 70° C. by external cooling. After all the dodecene oxide was added, the reaction mixture was heated to 72° C. and held at this temperature for 4 hours. The catalyst was removed and the stripping of the product was performed in the same fashion as described in Example I. The final yield of the product was 268 grams, corresponding to a 90.1% yield of a polyphosphate ester containing 8.1 dodecene oxide groups per mol of propylene oxide-polyphosphoric acid reaction product. The product had a hydroxyl number of 109 and an acid number of 4.6.

Example VI 3556 grams (28.0 mols) of 3,3-dichloropropylene oxide were added dropwise to 196 grams (2.00 mols) of 100% phosphoric acid at 65 to 70° C. in the presence of a total of 35.0 grams (247 millimols) of boron trifluoride etherate. The additions were stepwise and, except as outlined below, were conducted in the same manner as Example III. The first 12 mols of the 3,3-dichloropropylene oxide (6 mols of oxide per mol of 100% orthophosphoric acid) were added without the presence of external catalyst. At this point, an essentially neutral phosphate ester remained and further reaction with 3,3-dichloropropylene oxide proceeded only after the addition of boron trifluoride etherate which was added in 5 equal increments. The first increment was added after 12 mols of 3,3-dichloropropylene oxide had been added. The second, third and fourth increments of boron trifluoride etherate were added after 18, 22 and 28 mols of oxide had been reacted, respectively. The fifth increment was added after the latter reaction was no longer exothermic. The catalyst was removed and the stripping of the product was performed in the same fashion as described in Example I. The final yield was 84% of the phosphoric acid ester containing 11.6 dichloro-oxypropylene groups per phosphoric acid unit.

Example VII 169 grams (.108 mol) of the product of Example VI were added to a 0.25-liter, 3-necked, round-bottom flask equipped with a stirrer, condenser, thermometer and dropping funnel. 0.5 gram (3.52 millimols) of boron trifluoride etherate was added to the polymer with stirring. The reaction mixture was then heated to 60° C. and 69.6 grams (1.2 mols) of propylene oxide were added dropwise with stirring over a 2-hour period while the reaction mixture was maintained at between 65° and 70° C. by external cooling. After all of the propylene oxide was added, the reaction mixture was heated to 70° C. and held at this temperature for 2 hours. The catalyst was removed and stripping of the product was performed in the same manner as described in Example I. The final product contained 8 oxypropylene groups per mol of starting material.

Example VIII 459 grams (1 mol) of an essentially neutral 1,2-butylene oxide-100% phosphoric acid reaction product containing 5 oxybutylene groups per phosphoric acid unit are reacted with 648 grams (9 mols) of butylene oxide, in the presence of 1.56 grams (18 millimols) of boron trifluoride etherate by the procedure described in Example I. A phosphate ester containing 12 oxybutylene groups per phosphoric acid unit is obtained.

*Example IX*

1856 grams (32.0 mols) of propylene oxide were added to a 3-liter, 3-necked, round-bottom flask equipped with a stirrer, condenser, thermometer and dropping funnel. 92 grams (4.00 mols) of 100% phosphoric acid containing 10 grams (704 millimols) boron trifluoride etherate were added dropwise to the propylene oxide with stirring over a 5.6-hour period. The reaction was exothermic and the reaction mixture was refluxed during the acid addition. The catalyst was removed and stripping of the product performed in the same fashion as described in Example I. The final yield was 92% of phosphate ester containing 7.4 oxypropylene groups per phosphoric acid unit.

*Example X*

126 grams (1.00 mol) of bis(hydroxymethyl)phosphinic acid are added to a 1-liter, 3-necked, round-bottom flask equipped with a stirrer, condenser, thermometer and dropping funnel. The acid is heated to 65° C. and 116 grams (2 mols) of propylene oxide are added dropwise with stirring without the presence of any external catalyst while the reaction mixture is maintained at between 65 and 70° C. by external cooling. 2.6 grams of boron trifluoride etherate are then added to the reaction mixture, followed by the dropwise addition of 156 grams (2.72 mols) of propylene oxide. 2.6 more grams of boron trifluoride etherate are then added to the reaction mixture, followed by the addition of 24.9 grams (0.43 mol) propylene oxide dropwise to the reaction mixture. An additional 5 grams of boron trifluoride etherate are then added to the reaction mixture, making a total of 72 millimols of boron trifluoride etherate. A final 167 grams (2.86 mols) of propylene oxide are then added dropwise. The propylene oxide additions are at a rate of 46 grams per hour. After all the propylene oxide is added, the reaction mixture is heated to 70° C. and held at this temperature for 2 hours. The catalyst is then removed and volatiles stripped in the same manner as described in Example I. The final product is a phosphinic acid ester containing 8 oxypropylene groups per bis(hydroxymethyl)phosphinic acid unit.

*Example XI*

280 grams (0.500 mol) of an essentially neutral epichlorohydrin-phosphoric acid ester, prepared by the reaction of epichlorohydrin with 100% phosphoric acid, were added to a 1-liter, 3-necked, round-bottom flask equipped with a stirrer, condenser, thermometer and dropping funnel. 1.3 grams (9.2 millimols) of commercial boron trifluoride etherate were then added to the flask with stirring. The reaction mixture was then heated to 60° C., followed by the dropwise addition of 288 grams (3.1 mols) of epichlorohydrin. 1.3 more grams of boron trifluoride etherate were then added to the reaction mixture, followed by the addition of 144 grams (1.56 mols) epichlorohydrin dropwise to the reaction mixture. An additional 0.7 gram of boron trifluoride etherate was added to the reaction mixture after the epichlorohydrin addition was complete, making a total 129 millimols of boron trifluoride etherate. After all of the epichlorohydrin was added, the reaction mixture was heated to 70° C. and held at this temperature for 2 hours. The catalyst was then removed and the volatiles stripped in the same manner as described in Example I. The final yield was 98.6% of a chlorinated phosphate ester containing 14.1 chlorinated oxypropylene groups per phosphoric acid unit.

It is to be understood that various changes and modifications may be made in the foregoing without departing from the spirit of the invention and scope of the appended claims.

We claim:

1. A method of producing a phosphorus-containing compound comprising reacting, in the presence of a catalyst selected from the group consisting of boron trifluoride and stannic chloride, an alkylene oxide with a compound selected from the group consisting of an acid of phosphorus and the reaction product of an acid of phosphorus and an alkylene oxide wherein said acid of phosphorus corresponds to a mixture of phosphorus pentoxide and water containing from about 72.4 to 90 percent by weight of phosphorus pentoxide with from about 10 to 27.6 percent by weight of water and said phosphorus-containing compound incorporates an average of more than two moles of said alkylene oxide per OH group of said acid of phosphorus.

2. The method of claim 1 wherein said acid of phosphorus is orthophosphoric acid.

3. The method of claim 1 wherein said catalyst is boron trifluoride.

4. The method of claim 1 wherein said catalyst is stannic chloride.

5. The method of claim 1 wherein said alkylene oxide is a chlorinated alkylene oxide.

6. The method of claim 1 wherein said alkylene oxide is selected from the group consisting of propylene oxide, 1,2-butylene oxide, dodecene oxide, epichlorohydrin and 3,3-dichloropropylene oxide.

7. The method of claim 1 wherein said alkylene oxide is propylene oxide.

8. A method of producing a phosphorus-containing compound comprising the steps of reacting in the presence of a catalyst selected from the group consisting of boron trifluoride and stannic chloride, an alkylene oxide with a reaction product of an acid of phosphorus and an alkylene oxide wherein said acid of phosphorus corresponds to a mixture of phosphorus pentoxide and water containing from about 72.4 to 90 percent by weight of phosphorus pentoxide with from about 10 to 27.6 percent by weight of water and said phosphorus-containing compound incorporates an average of more than two moles of said alkylene oxide per OH group of said acid of phosphorus.

9. A method of producing a phosphorus-containing compound comprising the steps of reacting propylene oxide with a reaction prdouct of orthophosphoric acid and propylene oxide in the presence of boron trifluoride wherein said phosphorus-containing compound incorporates an average of more than two moles of said alkylene oxide per OH group of said acid of phosphorus.

10. A method of producing a phosphorus-containing compound comprising the steps of reacting, in the presence of a catalyst selected from the group consisting of boron trifluoride and stannic chloride, an alkylene oxide with an acid of phosphorus wherein said acid of phosphorus corresponds to a mixture of phosphorus pentoxide and water containing from about 72.4 to 90 percent by weight of phosphorus pentoxide with from about 10 to 27.6 percent by weight of water and said phosphorus-containing compound incorporates an average of more than two moles of said alkylene oxide per OH group of said acid of phosphorus.

11. A method of producing a phosphorus-containing compound comprising the steps of reacting propylene oxide with orthophosphoric acid in the presence of boron trifluoride wherein said acid of phosphorus corresponds to a mixture of phosphorus pentoxide and water containing from about 72.4 to 90 percent by weight of phosphorus pentoxide with from about 10 to 27.6 percent by weight of water and said phosphorus-containing compound incorporates an average of more than two moles of said alkylene oxide per OH group of said acid of phosphorus.

12. A method of producing a phosphorus-containing compound comprising reacting, at a temperature in the range of from about 0 to 150° C., an alkylene oxide with a reaction product of an acid of phosphorus and an alkylene oxide containing from about 1 to 3 reacted epoxy groups per OH unit of said acid in a proportion of from about 1 to 150 mols of said alkylene oxide per mol of said reaction product in the presence of a catalyst selected from the group consisting of boron trifluoride and stannic chloride, the amount of said catalyst being from about 0.05 to 5 percent by weight of the total reactants wherein said acid of phosphorus corresponds to a mixture of phosphorus pentoxide and water containing from about 72.4 to 90 percent by weight of phosphorus pentoxide with from about 10 to 27.6 percent by weight of water and said phosphorus-containing compound incorporates an average of more than two moles of said alkylene oxide per OH group of said acid phosphorus.

13. A method of producing a phosphorus-containing compound comprising the steps of reacting at a temperature in the range of from about 0 to 150° C. an alkylene oxide with an acid of phosphorus in a proportion of from about 6 to 150 mols of said alkylene oxide per mol of said acid of phosphorus in the presence of a catalyst selected from the group consisting of boron trifluoride and stannic chloride, the amount of said catalyst being from about 0.05 to 5 percent by weight of the total reactants wherein said acid of phosphorus corresponds to a mixture of phosphorus pentoxide and water containing from about 72.4 to 90 percent by weight of phosphorus pentoxide with from about 10 to 27.6 percent by weight of water and said phosphorus-containing compound incorporates an average of more than two moles of said alkylene oxide per OH group of said acid of phosphorus.

References Cited by the Examiner

UNITED STATES PATENTS

| | | | |
|---|---|---|---|
| 2,587,340 | 2/1952 | Lewis et al. | 260—953 |
| 3,201,438 | 8/1965 | Reed | 260—953 X |
| 3,205,120 | 9/1965 | Flanders. | |

CHARLES B. PARKER, *Primary Examiner.*

JOSEPH P. BRUST, *Examiner.*

FRANK M. SIKORA, B. BILLIAN, *Assistant Examiners.*